United States Patent [19]

Del Zotto et al.

[11] 4,020,807
[45] May 3, 1977

[54] IGNITION-CONTROL SYSTEM FOR INTERNAL-COMBUSTION ENGINE

[75] Inventors: Giorgio Del Zotto, Cividale (Udine); Mario Costa, Milan, both of Italy

[73] Assignee: SGS-ATES Componenti Elettronici S.p.A., Agrate (Milan), Italy

[22] Filed: Jan. 16, 1974

[21] Appl. No.: 433,652

[52] U.S. Cl. .................. 123/117 R; 123/148 E
[51] Int. Cl.² ........................................ F02P 1/00
[58] Field of Search .............. 123/117 R, 146.5 A, 123/148 E

[56] References Cited
UNITED STATES PATENTS

| | | | |
|---|---|---|---|
| 3,454,871 | 7/1969 | Nolting | 123/117 R |
| 3,592,178 | 7/1971 | Schiff | 123/117 R |
| 3,738,339 | 6/1973 | Huntzinger et al. | 123/117 R |
| 3,749,070 | 7/1973 | Oishi et al. | 123/117 R |
| 3,757,755 | 9/1973 | Carner | 123/117 R |
| 3,796,197 | 3/1974 | Locher et al. | 123/117 R |
| 3,799,136 | 3/1974 | Korteling | 123/117 R |
| 3,811,420 | 5/1974 | Vogel | 123/117 R |
| 3,853,103 | 12/1974 | Wahl et al. | 123/117 R |
| 3,867,916 | 2/1975 | Bigalke | 123/117 R |
| 3,881,458 | 5/1975 | Roozenbeek et al. | 123/117 R |
| 3,888,220 | 6/1975 | Bigalke et al. | 123/117 R |
| 3,890,944 | 6/1975 | Werner et al. | 123/117 R |

Primary Examiner—C. J. Husar
Assistant Examiner—Paul Devinsky
Attorney, Agent, or Firm—Karl F. Ross; Herbert Dubno

[57] ABSTRACT

In order to vary the timing of the ignition of an air/fuel mixture in a cylinder of an internal-combustion engine as a function of engine speed, a flip-flop is set by an engine-controlled switch at a predetermined point $t_0$ in the cycle, in a position preceding by an angle $\alpha_0$ the upper-dead-center position of an associated piston, to effect a rapid discharge and to start a slow recharge, at constant rate, of a capacitor $C_1$ forming part of a time/-voltage converter. The maximum voltage attained by this capacitor at the end of a cycle, as a measure of cycle length T, is registered in an ancillary capacitor $C_3$ as another capacitor $C_2$, forming part of a voltage/time converter, also begins charging at time $t_0$ at a rate making the charges of capacitors $C_2$ and $C_3$ equal on or before the attainment of the UDC position. This equality is detected by a comparator which thereupon, at a time $t_0+t\gamma$, resets the flip-flop to trigger an igniter for the associated cylinder. The charging rate of capacitor $C_2$ may be modified by one or more sensing circuits responsive to external parameters and/or by one or more threshold circuits upon the charge of capacitor $C_1$ or $C_2$ reaching a predetermined level. Capacitors $C_2$ and $C_3$ are discharged upon the resetting of the flip-flop, the recharging of capacitor $C_3$ beginning shortly thereafter.

10 Claims, 3 Drawing Figures

IGNITION-CONTROL SYSTEM FOR INTERNAL-COMBUSTION ENGINE

FIELD OF THE INVENTION

Our present invention relates to a system for controlling the ignition of an automotive or other internal-combustion engine, more particularly for timing the operation of a spark plug or other igniter to fire a combustible fuel/air mixture in a piston cylinder of such an engine.

BACKGROUND OF THE INVENTION

In conventional systems of this nature, a mechanical or electronic switch is periodically opened or closed under the control of an engine-driven shaft, e.g., by a cam on that shaft or by a photoelectric signal detector coupled therewith. In general, ignition should occur during the compression stroke of the reciprocating piston of each cylinder, prior to the arrival of that piston in the end position of that stroke (usually referred to as upper dead center or UDC). However, the extent of advancement of the firing point with reference to the UDC position for optimum efficiency depends on engine speed and is not constant in terms of either time or angle of rotation.

In earlier systems, the advance of the firing point was controlled mechanically through a linkage between a centrifugal speed sensor and the switch contacts of their controller. More recent developments, e.g., as disclosed in French Pat. No. 2,099,230, include electronic circuitry for establishing a variable delay between a predetermined reference point in the operating cycle, preceding the UDC position by more than the maximum advance of the firing point, and the instant of ignition. Many of these prior electronic systems were inherently unstable and required the establishment of at least two fixed reference points per cycle to provide a gauge for the requisite delay with continuous readjustment of that delay in response to an error signal.

OBJECTS OF THE INVENTION

The general object of our present invention is to provide an ignition-control system of the electronic type, avoiding the inaccuracies due to wear and unavoidable tolerances of mechanical controls, which is less complex and more dependable than conventional systems of this nature.

A more particular object is to provide means in such a system responsive to a single externally generated pulse per cycle for timing the ignition of a fuel/air mixture in a given cylinder, thus obviating the need for more than one reference point.

SUMMARY OF THE INVENTION

We realize these objects, in conformity with our present invention, by the provision of a measuring unit responsive to an externally generated start pulse for producing an electrical variable, such as a voltage, proportional to the duration T of an engine cycle; such a cycle may consist of two or four piston strokes, as is well known per se, though only a 4-stroke cycle will be considered in the specific description which follows. This measuring unit is connected to a timing unit which establishes a delay period $t_\gamma$ as a predetermined function of the duration T in response to the magnitude of this electrical variable. The timing unit, in turn, actuates an ignition-control unit to trigger the igniter at the end of the delay period $t_\gamma$. The corresponding angle $\gamma = \alpha_0 - \alpha$ is the difference between the angular distance $\alpha_0$ of the start position (in which a pulse is generated by the engine-controlled switch) and the lead angle $\alpha$ of the firing point with reference to the UDC position.

According to a more specific feature of our invention, the measuring circuit and the delay circuit respectively include a first and a second capacitor each provided with charging and discharging means, the first capacitor being part of a time/voltage converter and the second capacitor being part of a complementary voltage/time converter. The first capacitor, upon being briefly discharged in response to the start pulse, charges at a constant rate to develop a linearly rising first voltage $V_1$ whose peak value at the end of a cycle is proportional to the cycle length T. This peak value is stored on an ancillary capacitor and preserved for a fraction of a following cycle so as to be available for comparison with a second voltage $V_2$ generated on the second capacitor which begins to charge at the same time as the first capacitor, at the instant $t_0$ of the start pulse, but at a more rapid rate so that its voltage reaches the stored peak value within the allotted ignition interval generally terminating with the end of the compression stroke, i.e., upon arrival of the piston in its UDC position. A comparator detecting the identity of the two voltages, $V_1$, $V_2$ emits a stop pulse which causes the triggering of the igniter and discharges both the second capacitor and the ancillary capacitor, the former remaining discharged until the arrival of the next start pulse.

In an advantageous embodiment, the aforementioned start and stop pulses serve for the setting and the resetting, respectively, of a flip-flop controlling the initiation of the charging and discharging operations of the several capacitors; the ignition-control circuit can also be actuated by this flip-flop.

In many instances, the optimum delay period $t_\gamma$ and the corresponding angle of rotation $\gamma = \alpha_0 - \alpha$ are not linear functions of either the engine speed $n$ or the cycle length T. Good results, however, are usually realized by dividing the speed range of the engine into several subranges and establishing the lead angle $\alpha$ (and, with it, the delay angle $\gamma$) as a substantially linear function of engine speed $n$ within each subrange; the delay period $t_\gamma$ is then a substantially linear function, different for each subrange, of the cycle length T as will be shown hereinafter. The different proportionality factors of the several subranges can be taken into account by modifying the rate of charge of the second capacitor, included in the voltage/time converter, as the voltage $V_1$ and $V_2$ reaches a level corresponding to a certain length of time T or $t_\gamma$; this level may be detected by a threshold circuit comparing the capacitor voltage with a reference voltage. The latter voltage may be manually preselected but could also be automatically generated as a function of an external parameter monitored by a sensing circuit, e.g., the degree of vacuum in the intake manifold of the engine or the temperature of its cylinders, which influences the optimum setting of the firing point.

Naturally, a voltage $V_c$ proportional to the cycle length T does not require a charging of the corresponding capacitor (with the aid of a constant-current source) for a full cycle but could also be produced if the charging lasts only for a predetermined fraction thereof. Thus, in an engine of $m$ cylinders firing in staggered relationship, according to conventional practice, there may be $m$ equispaced start pulses per cycle, resulting in as many settings and resettings of the flip-flop, provided that the triggering signals from that flip-flop are suitably distributed to the respective igniters of the several cylinders. In a 4-cylinder engine, for example, nearly a quarter-turn of the control shaft (corresponding to almost half a turn of the engine shaft) will then be available for each setting and resetting of the flip-flop.

BRIEF DESCRIPTION OF THE DRAWING

The above and other features of our invention will now be described in detail with reference to the accompanying drawing in which.

SPECIFIC DESCRIPTION

Figure 1A:
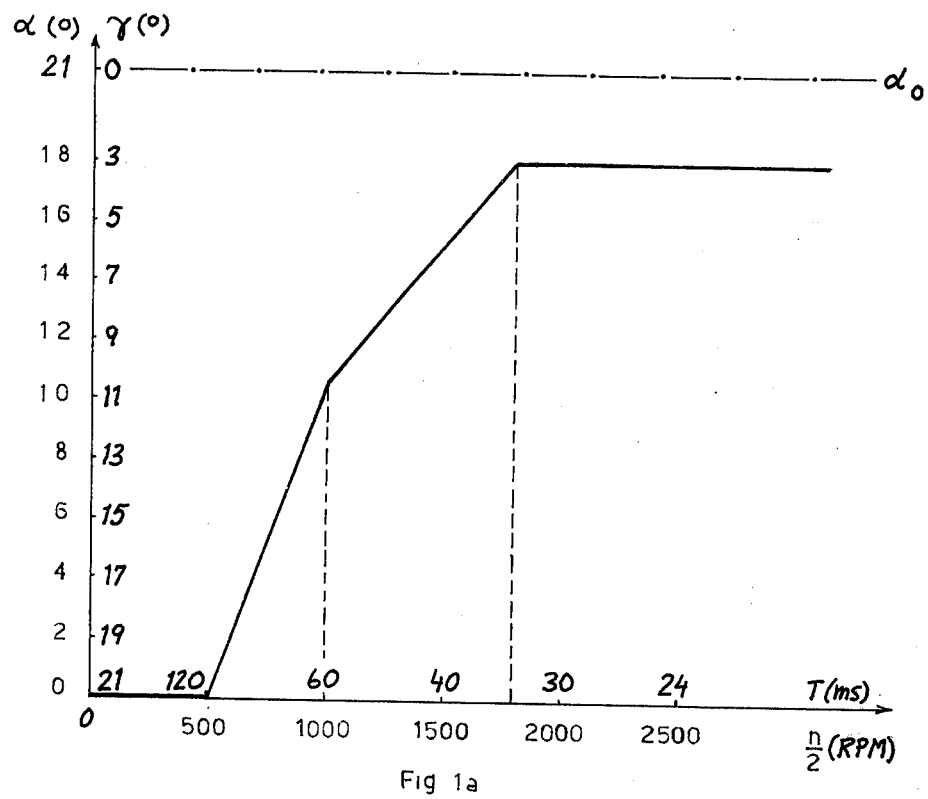
FIGS. 1a and 1b are graphs serving to explain the operating principle of a system according to our invention.

In FIG. 1a we have plotted the lead angle $\alpha$ and the delay angle $\gamma$ against the speed $n/2$ (in revolutions per minute) of a control shaft and the corresponding cycle length T (in milliseconds); the angles $\alpha$ and $\gamma$ are given in degrees of rotation of the control shaft which turns at half the engine speed $n$. For the typical 4-stroke engine chosen by way of example, with engine speeds ranging up to about 3000 RPM, the optimum lead angle $\alpha$ remains constant at about 0° at the lower end of the range, then rises linearly to 11° between 500 and 1000 RPM (corresponding to a cycle length between 120 and 60 ms), thereupon increases at a reduced rate to 18° at about 1875 RPM (or 32 ms) and finally remains substantially stationary at the latter value. In this highest subrange, the angle $\alpha$ could also approach asymptotically the reference angle $\alpha_0$ (here equaling 21°), yet the simpler assumption of a constant lead angle at these higher speeds is quite satisfactory in practice. The delay angle $\gamma = \alpha_0 - \alpha$ ranges from 21° at the lower end of the range to 30° at its upper end.

The relationship between the cycle length T and the shaft speed $n/2$ is given by $$T = \frac{60,000}{n/2} \, ms \qquad (1)$$

The delay time $t_\gamma$ can be determined from the relationship $$t_\gamma : T = \gamma : 360 \qquad (2)$$

whence $$t_\gamma = \frac{\gamma T}{360} \qquad (3)$$

Thus, the time $t_\gamma$ is directly proportional to T and inversely proportional to $n$.

Figure 1B:
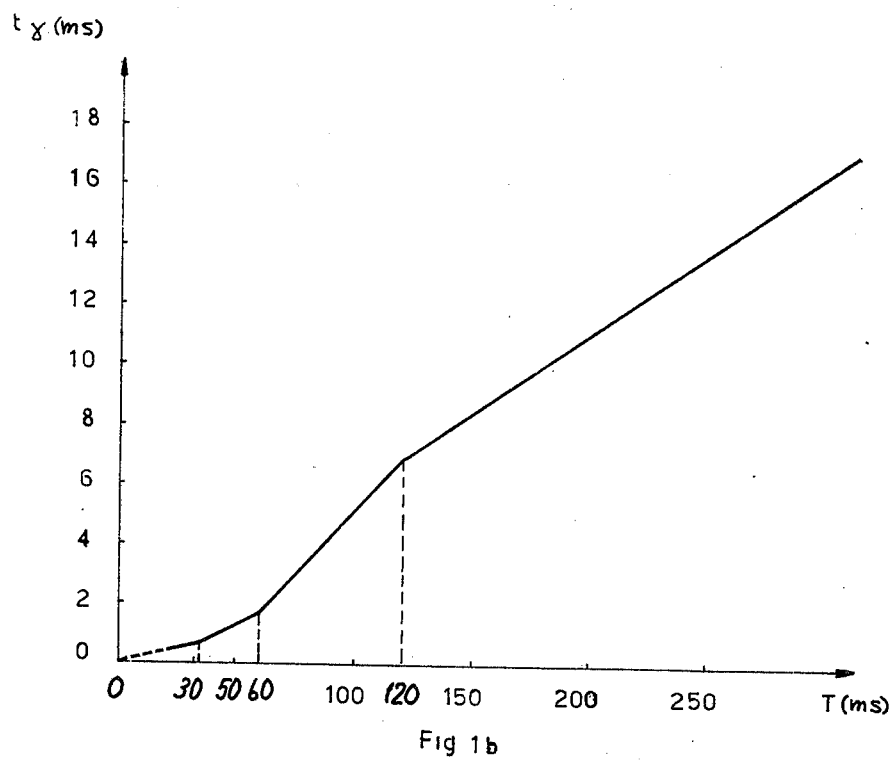

In FIG. 1b this delay time has been plotted, in ms, against cycle length T within the range of FIG. 1a. Like the function $\alpha(n)$ of FIG. 1a, the function $t_\gamma$ (T) of FIG. 1b follows a broken line composed of straight segments within each subrange; the lowermost segment of graph $t_\gamma$ has been shown dotted in the vicinity of the origin since the corresponding low values of cycle length T cannot be realized in practice.

Figure 2:
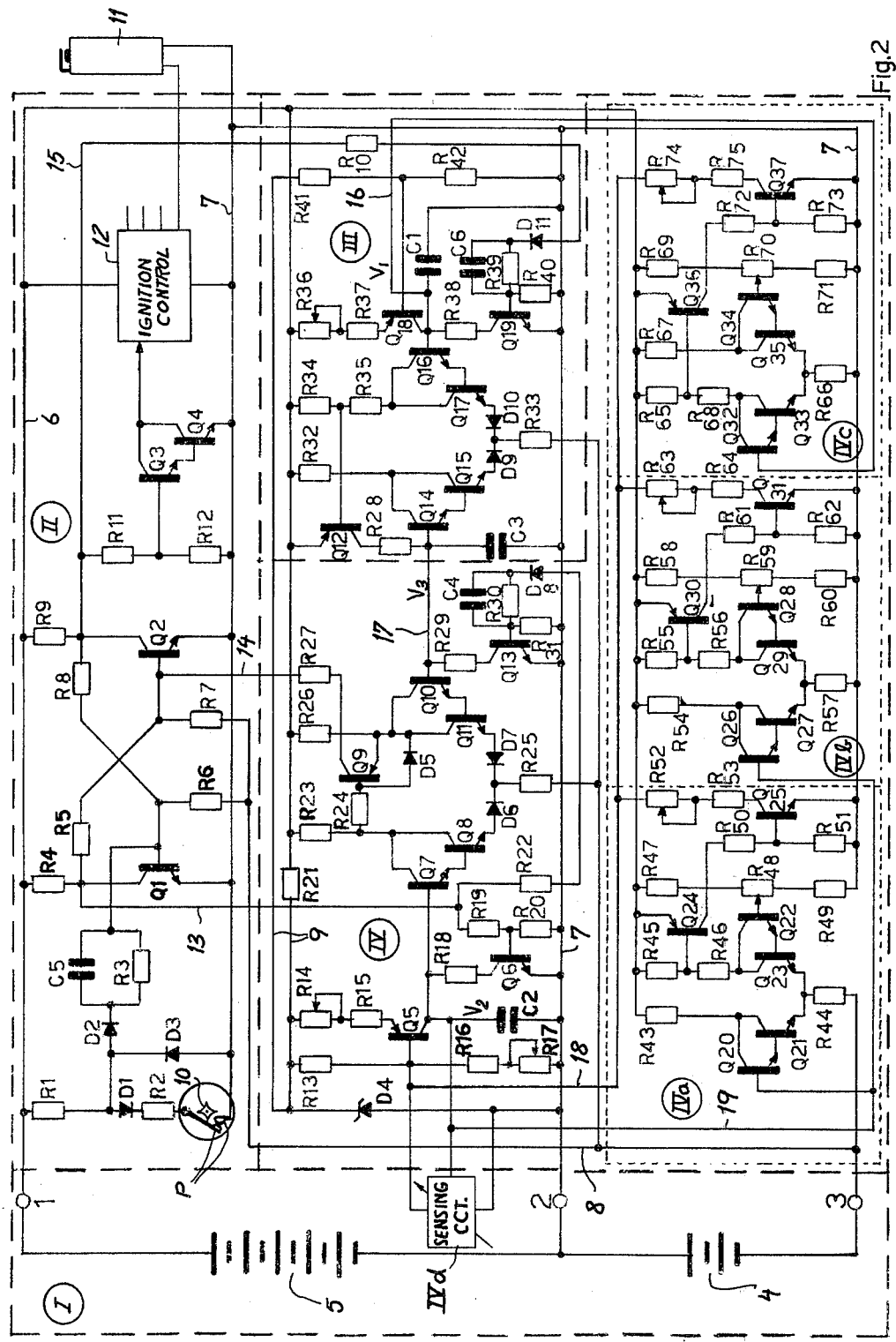
FIG. 2 is a circuit diagram of a representative embodiment.

In FIG. 2 we have shown an ignition-control system designed to establish the function $t_\gamma$ (T) of FIG. 1b by purely electronic means, with the possible exception of a pair of normally closed switch contacts P which are periodically opened for an instant by a cam 10 on a control shaft driven by a 4-cylinder engine not further illustrated. Contacts P are, however, also representative of an electronic circuit breaker opened, e.g., photoelectrically, in a start position of the control shaft rotating at speed $n/2$. Cam 10 is shown to have four humps opening the contacts P in four start positions spaced 90° apart, each start position occurring during a compression stroke of a respective piston of the engine.

The several cylinders are equipped with respective spark plugs 11 (only one shown) triggerable by an ignition-control circuit 12 which includes a distributor enabling the energization of each spark plug only during a respective quarter-turn of the shaft carrying the cam 10.

This shaft may also have additional cams, not shown, for the staggered closure of four sets of contacts controlling the operation of the distributor.

Circuit 12 may include an electronic gate, such as a thyristor, in the discharge circuit of a capacitor charged to a high voltage through a d-c/d-c converter, the discharge current being transmitted through a transformer to the spark plug 11.

It may also comprise a pulse generator, such as a monostable multivibrator or monoflop, for establishing an ignition period of fixed or variable length as is well known per se.

The principal components of the system of FIG. 2 are a power supply I, a switching unit II including the contacts P and the controller 12, a measuring unit III including a time/voltage converter, and a timing unit IV including a voltage/time converter. It further comprises several ancillary biasing or threshold circuits IVa, IVb, IVc and IVd.

Power supply I comprises two cascaded batteries 4 and 5 connected between three terminals, i.e., a positive terminal 1, an intermediate terminal 2 and a negative terminal 3.

Naturally, this showing is representative of a variety of conventional energizing circuits including, for example, a single battery connected between terminals 1 and 3, with terminal 2 constituted by a tap on a voltage divider bridged across that battery.

Terminals 1, 2 and 3 are tied to respective bus bars 6, 7 and 8; an ancillary bus bar 9 is energized from bus bar 6 through a resistor R21 and is connected to bus bar 7 through a Zener diode D4 maintaining a constant voltage difference between bus bars 7 and 9. Terminal 2 and bus bar 7 may be grounded. Ignition-control circuit 12 is inserted between bus bars 6 and 7.

Switching unit II comprises a flip-flop formed by two NPN transistors Q1 and Q2 with emitters tied to bus bar 7 and collectors connected via respective resistors R4 and R9 to bus bar 6; their bases are biased by respective voltage dividers consisting of resistors R6, R8 and R5, R7 inserted between the opposite collectors and bus bar 8.

Transistor Q1 has an input circuit including two resistors R1 and R2 connected in series with a diode D1 and switch contacts P between bus bars 6 and 7, elements D1, R2 and P being shunted by a reverse-connected diode D3. The junction of resistor R1 and diode D1 is connected to the base of transistor Q1 through a diode D2 and an R/C network consisting of a resistor R3 in parallel with a capacitor C5. A lead 13 extends from the collector of transistor Q1 to unit IV while another lead 14 emanating from that unit terminates at the base of transistor Q2. The collector of the latter transistor is tied to a lead 15 connected via a voltage divider R11, R12 to bus bar 7. The junction of resistors R11 and R12 is connected to the base of the first stage Q3 of a Darlington-type transistor circuit whose second stage Q4 has its emitter joined to bus bar 7; the collectors of both stages receive positive potential from ignition-control circuit 12.

In the reset state of flip-flop Q1, Q2, its stage Q2 conducts so that voltage divider R11, R12 is virtually short-circuited and the resistance of the Darlington group Q3, Q4 is high. Upon a brief opening of contacts P by the cam 10, stage Q1 is turned on by a positive pulse traversing the capacitor C5 so that the flip-flop is set and stage Q2 is cut off; the highly positive voltage on lead 15 sharply reduces the resistance of transistor Q4, thereby correspondingly lowering its collector potential. Upon the subsequent energization of lead 14, as described hereinafter, flip-flop Q1, Q2 is once more reset to generate within control circuit 12 a positive pulse which fires the spark plug 11. Thus, the time between the setting of the flip-flop by a start pulse from contacts P and its resetting by a stop pulse on lead 14 represents the delay $t\gamma$ discussed with reference to FIG. 1b.

Unit III comprises a capacitor C1 connected between bus bar 7 and a lead 16; this capacitor is chargeable from bus bar 6 through a source of constant but adjustable current represented by a PNP transistor Q18 in series with a variable resistor R36 and a constant fixed resistor R37, these two resistors being inserted between the emitter of that transistor and the bus bar. The base of transistor Q18 is fixedly biased by a voltage divider R41, R42 connected between bus bar 7 and ancillary bus bar 9. A discharge circuit for capacitor C1 includes an NPN transistor Q19 having its emitter tied to bus bar 7 and its collector joined to the capacitor through a resistor R38; the base of transistor Q19 is returned to bus bar 7 through a resistor R40 and is joined to lead 15 by way of an R/C network R39, C6 in series with a diode D11 and a resistor R10. Upon the setting of flip-flop Q1, Q2 by a start pulse as described above, the positive-going voltage on lead 15 briefly saturates the transistor Q19 through condenser C6 shunted by resistor R39; the time constant of network C6, R39 is short with reference to the minimum cycle length T so that capacitor C1 discharges within a small fraction of a quarter-cycle (i.e., of a 90° turn of cam 10) whereupon transistor Q19 promptly cuts off and capacitor C1 charges at a linear rate to develop on lead 16 a positive-going voltage $V_1$ varying linearly with time. With such a negligible discharge period, the next setting of flip-flop Q1, Q2 finds the voltage $V_1$ at a peak value substantially proportional to the time T/4 and therefore also to the cycle length T.

An ancillary capacitor C3 in unit III serves for the storage of this peak voltage $V_1$ beyond the quarter-cycle in which it was generated. Capacitor C3 is connected to capacitor C1 by a transfer circuit including two Darlington pairs of NPN transistors Q14, Q15 and Q16, Q17 which lie between bus bars 6 and 8 in series with respective collector resistances R32 and R34, R35 as well as a common emitter resistor R33; two protective diodes D9 and D10 are inserted between the latter resistor and the emitters of transistors Q15 and Q17.

The base of transistor Q16 is tied to lead 16 whereas the base of transistor Q14 is connected to a junction of capacitor C3 with a resistor R28 lying in the collector lead of a PNP transistor Q12 whose emitter is joined to bus bar 6. The base of transistor Q12 is connected to the junction of resistors R34 and R35 which are so proportioned as to let the transistor Q12 conduct whenever the transistor Q17 draws current, thereby charging the ancillary capacitor C3. The Darlington pair Q14, Q15, cut off in the discharged state of capacitor C3, becomes progressively more conductive upon the charging of that capacitor until the current drawn by transistor Q15 matches that flowing through transistor Q17. From that point on, owing to the symmetry of the transfer circuit, the voltage $V_3$ generated on an output lead 17 of capacitor C3 matches the voltage $V_1$ of capacitor C1 inasmuch as any rise of $V_3$ above $V_1$ would tend to increase the current through transistor Q15 at the expense of the current through transistor Q17 whereby the reduced voltage drop across resistor R34 throttles the flow of charging current through transistor Q12.

Capacitor C3 has a discharge circuit extending from lead 17 to bus bar 7 through a resistor R29 in series with an NPN transistor Q13. The base of this transistor, whose emitter is directly tied to that bus bar, is connected to the collector lead 13 of flip-flop stage Q1 through an R/C network R30, C4 in series with a diode D8 and the resistor R22; a further resistor R31 lies between this base and bus bar 7. Thus, transistor Q13 is rendered conductive through capacitor C4, shunted by resistor R30, whenever lead 13 is driven positive by the resetting of the flip-flop; the time constant of network C4, R30 is also short, compared to the cycle length T, so that capacitor C3 can start recharging at the same time as capacitor C1 immediately after the discharge of the latter capacitor upon the setting of flip-flop Q1, Q2 by a start pulse from switch P. With the two matching transistors Q15 and Q17 cut off at different times by the discharge of their respective capacitors, they are protected against harmful transient voltages of reversed polarity by the associated diodes D9 and D10.

The discharge circuit including transistor Q13 forms part of the timing unit IV which includes a capacitor C2 chargeable at a predetermined but variable rate through a PNP transistor Q5 and a pair of resistors R14, R15, this circuit being analogous to the charging circuit R36, R37, Q18 of capacitor C1. The base of transistor Q5 is tied to a lead 18 at the junction of two resistors R13, R16 which form part of a voltage divider, also including an adjustable resistor R17, inserted between bus bars 7 and 9 in parallel with capacitor C2 and its charging impedances. Capacitor C2 develops on a lead 19 a voltage $V_2$ applied to the base of the first stage Q7 of a Darlington pair of NPN transistors Q7, Q8, this pair forming with a similar pair of transistors Q10, Q11 a comparator for detecting a match between voltage $V_2$ and the stored voltage $V_3$ of capacitor C3 applied to the base of transistor Q10. Transistors Q8 and Q11 have their emitters connected through respective diodes D6, D7 and a common resistor R25 to bus bar 8; the two Darlington pairs are provided with respective collector resistors R23 and R26 tied to bus bar 6. The collectors of transistors Q7 and Q8 are further respectively connected through a resistor R24 and a diode D5 to the base of a PNP transistor Q9 whose emitter is tied to the collectors of transistors Q10 and Q11, diode D5 forming a bypass for reverse current between the base and the emitter of transistor Q9. The collector of this transistor is connected through a resistor R27 to the resetting lead 14 of flip-flop Q1, Q2.

Capacitor C2 has a discharge circuit comprising an NPN transistor Q6 in series with a resistor R18, the base of this transistor being tied to the junction of two resistors R19, R20 inserted between lead 13 and bus bar 7. This discharge circuit, in contrast to those of capacitors C1 and C3, is entirely resistive so that transistor Q6 conducts as long as the potential of lead 13 is highly positive, i.e., while the flip-flop Q1, Q2 is reset. Upon the setting of this flip-flop, capacitor C2 begins to charge through transistor Q5 at a rate fast enough to let the voltage $V_2$ attain the level of voltage $V_3$ within the current quarter-cycle, i.e., before the cam 10 has turned through the angle $\alpha_0$ into the position corresponding to the end of the compression stroke then in progress. As long as voltage $V_2$ is less than voltage $V_3$, transistor Q8 is cut off since voltage $V_3$ is also present on the emitter of transistor Q8 owing to the negligible forward resistance of transistors Q10 and Q11 as well as diode D7. When, however, voltage $V_2$ rises past the level $V_3$, transistor Q8 carries current at the expense of transistor Q11 and quickly saturates while transistor Q11 is cut off. The resulting switchover drives the base of transistor Q9 more negative than its emitter so that current now flows from positive bus bar 6 through resistor R26, transistor Q9 and resistor R27 to lead 14 to reset the flip-flop Q1, Q2.

At this point the capacitors C2 and C3 are discharged, as described above, and a firing command is transmitted to ignition-control circuit 12 via the Darlington pair Q3, Q4.

With the system so far described, the graph $t_\gamma$ of FIG. 1b would be a straight line as the capacitor C2 is charged at a constant rate through transistor Q5 so as to make voltage $V_2$ proportional to cycle length T as measured by voltage $V_1$. However, the presence of threshold circuits IVa, IVb and IVc enables this charging rate to be modified so as to conform to the optimum mode of operation indicated in FIG. 1b.

Threshold circuit IVa comprises two Darlington pairs Q20, Q21 and Q22, Q23 similar to the transfer circuit Q14 – Q17 of unit III, these pairs being provided with a common emitter resistors R44 tied to bus bar 8 and with respective collector resistances R43 and R45, R46 tied to bus bar 6. The junction of resistors R45, R46 is joined to the base of a PNP transistor Q24 having its emitter tied to bus bar 6 and its collector connected to bus bar 7 via a pair of resistors R50 and R51, the junction of these latter resistors being joined to the base of an NPN transistor Q25 having its emitter tied to bus bar 7 and its collector connected to lead 18 through a fixed resistor R53 and an adjustable resistor R52. The setting of this latter resistor determines the amount of current to be drawn through the biasing resistor R13 of transistor Q5 upon saturation of transistor Q25.

The capacitor voltage $V_2$ is applied by lead 19 to the base of transistor Q20 whereas the base of its counterpart Q22 is connected to a tap on a potentiometer R48 forming part of a voltage divider R47 – R49 inserted between bus bars 6 and 7.

Threshold circuit IVa operates in a manner analogous to that of comparator Q7 – Q10, with transistor Q23 conducting as long as the voltage $V_2$ on lead 19 is less than the selected reference voltage applied by potentiometer R48 to the base of transistor Q22. As soon as voltage $V_2$ rises past that level, the resulting switchover cuts off the previously conductive transistors Q24 and Q25 so that circuit IVa no longer draws current through resistor R13. The ensuing rise in the base voltage of transistor Q5 increases the charging rate of capacitor C2; in conformity with FIG. 1b, this rate change may occur after a delay $t_\gamma$ of about ¼ ms corresponding to a cycle length T of approximately 32 ms.

Threshold circuit IVb is identical in its structure with circuit IVa, comprising transistors Q26 – Q31 and resistors R54 – R64. At the time circuit IVa cuts out, circuit IVb still draws current through resistors R13, R63 and R64 in series with transistor Q31. When voltage $V_2$ reaches another predetermined level, e.g., one corresponding to $t_\gamma = 1⅔$ ms and T = 60 ms as shows in FIG. 1b, circuit IVb also ceases to conduct and the charging rate of capacitor C2 further increases.

Threshold circuit IVc is similar to circuit IVa and IVb, comprising transistors Q32 – Q37 and resistors R65 – R75. Unlike these other circuits, however, circuit IVc has the selected reference voltage applied by potentiometer R70 to the base of transistor Q34 in series with the single resistor R67 whereas the voltage divider R65, R67, whose junction biases the switching transistor Q36, is connected to the collector of transistor Q32 whose base receives the variable capacitor voltage. Thus, circuit IVc is normally nonconductive and draws current only when the capacitor voltage increases above the preset reference voltage, in this specific instance after a delay $t_\gamma = 7$ ms corresponding to T = 120 ms (cf. FIG. 1b). Thus, the subsequent rise of voltage $V_2$ is less steep than in the preceding subrange, provided of course that the shaft speed n/2 is less than 500 RPM pursuant to FIG. 1a.

As specifically illustrated in FIG. 2, the time-dependent capacitor voltage applied to the base of transistor Q32 is the voltage $V_1$ from capacitor C1. Since both voltages $V_1$ and $V_2$ are predetermined functions of time, either of them could be fed to any of circuits IVa, IVb, IVc to establish the switchover points between the several subranges of engine speed.

Biasing circuit IVd, not shown in detail, may be similar in construction to any of the circuits IVa – IVc, except that the reference voltage provided in these latter circuits by potentiometers R48, R59 and R70 is replaced by the variable output of a sensor monitoring a system parameter such as engine temperature or manifold suction. Thus, circuit IVd may start conducting only after the engine has reached its normal mode of operation, thereby reducing the charging rate of capacitor C2 and delaying the firing point (with foreshortening of the lead angle $\alpha$) in comparison with warmup or overload conditions.

It will be evident that the system of FIG. 2 could be readily adapted to an engine of the two-stroke type. Also, if desired, each engine cylinder could be individually provided with a flip-flop Q1, Q2 and associated circuitry, the flip-flop being then set and reset only once per cycle to establish the delay $t_\gamma$ for the firing of a respective igniter. However, the specifically described arrangement is preferred not only for its simplicity but also because it positively prevents misfiring of any cylinder during any part of the cycle other than the corresponding compression stroke.

We claim:
1. A system for timing the operation of an igniter to fire a combustible mixture in a piston cylinder of an internal-combustion engine with reference to a prede- termined point in an operating cycle of its piston, comprising:

switch means for generating a recurrent start pulse to signal the beginning of a cycle of variable duration T;

measuring means including a first capacitor provided with first charging means activatable by said start pulse for generating a first voltage proportional to said duration T;

a second capacitor provided with second charging means activatable by said start pulse for generating a monotonically varying second voltage;

comparison means connected to said first and second capacitors for generating a stop pulse upon said first and second voltages attaining a predetermined relationship; and ignition-control means connected to said comparison means for emitting a trigger pulse at the end of a delay period determined by the magnitudes of said first and second voltages, said ignition-control means including a flip-flop settable by said start pulse and resettable by said stop pulse.

2. A system as defined in claim 1 wherein said measuring means comprises a third capacitor and transfer means for charging said third capacitor to said first voltage under the control of said first capacitor, further comprising first discharge means for said first capacitor triggerable by said flip-flop upon a setting thereof, and second and third discharge means for said second and third capacitors triggerable by said flip-flop upon a resetting thereof.

3. A system as defined in claim 2 wherein said first charging means includes a constant-current source establishing a relatively low charging rate for said first capacitor, said first discharge means including an electronic gate for establishing a relatively high discharging rate for said first capacitor.

4. A system as defined in claim 3 wherein said second charging means is effective to maintain said second capacitor discharged throughout the reset state of said flip-flop, said third discharge means being operative only during a small fraction of a cycle following the resetting of said flip-flop.

5. A system as defined in claim 2 wherein said transfer means and said comparison means each includes a pair of transistors of like conductivity type provided with a common emitter resistor and with respective diodes in series with said resistor.

6. A system as defined in claim 1 wherein said second charging means comprises a variable-current source provided with adjusting means for altering the magnitude of its charging current.

7. A system as defined in claim 6, further comprising a source of reference voltage and a comparator for detecting a match between the voltage of either of said capacitors and said reference voltage, said adjusting means including a transistor provided with a biasing circuit connected to said comparator for modifying the conductivity of said transistor in response to said match.

8. A system as defined in claim 7 wherein said source of reference voltage includes a sensor responsive to an external parameter.

9. A system for timing the operation of an igniter to fire a combustible mixture in a piston cylinder of an internal-combustion engine with reference to a predetermined point in an operating cycle of its piston, comprising:

switch means for generating a recurrent start pulse to signal the beginning of a cycle of variable duration T;

a first capacitor provided with first charging means activatable by said start pulse for generating a first voltage proportional to said duration T;

a second capacitor provided with second charging means activatable by said start pulse for generating a monotonically varying second voltage, said second charging means including an electronic control device provided with adjustable biasing means for altering the magnitude of its charging current;

a source of reference voltage;

first comparison means connected to said first and second capacitors for generating a stop pulse upon said first and second voltages attaining a predetermined relationship;

ignition-control means connected to said comparison means for emitting a trigger pulse at the end of a delay period determined by the magnitudes of said first and second voltages; and second comparison means for detecting a match between the voltage of either of said capacitors and said reference voltage, said biasing means being connected by said second comparison means for modifying the conductivity of said control device in response to said match.

10. A system as defined in claim 9 wherein said source of reference voltage includes a sensor responsive to an external parameter.

* * * * *